Oct. 26, 1948.   A. W. EDWARDS   2,452,442
AUTOMATIC RECLOSING CIRCUIT BREAKER
Filed Sept. 19, 1944
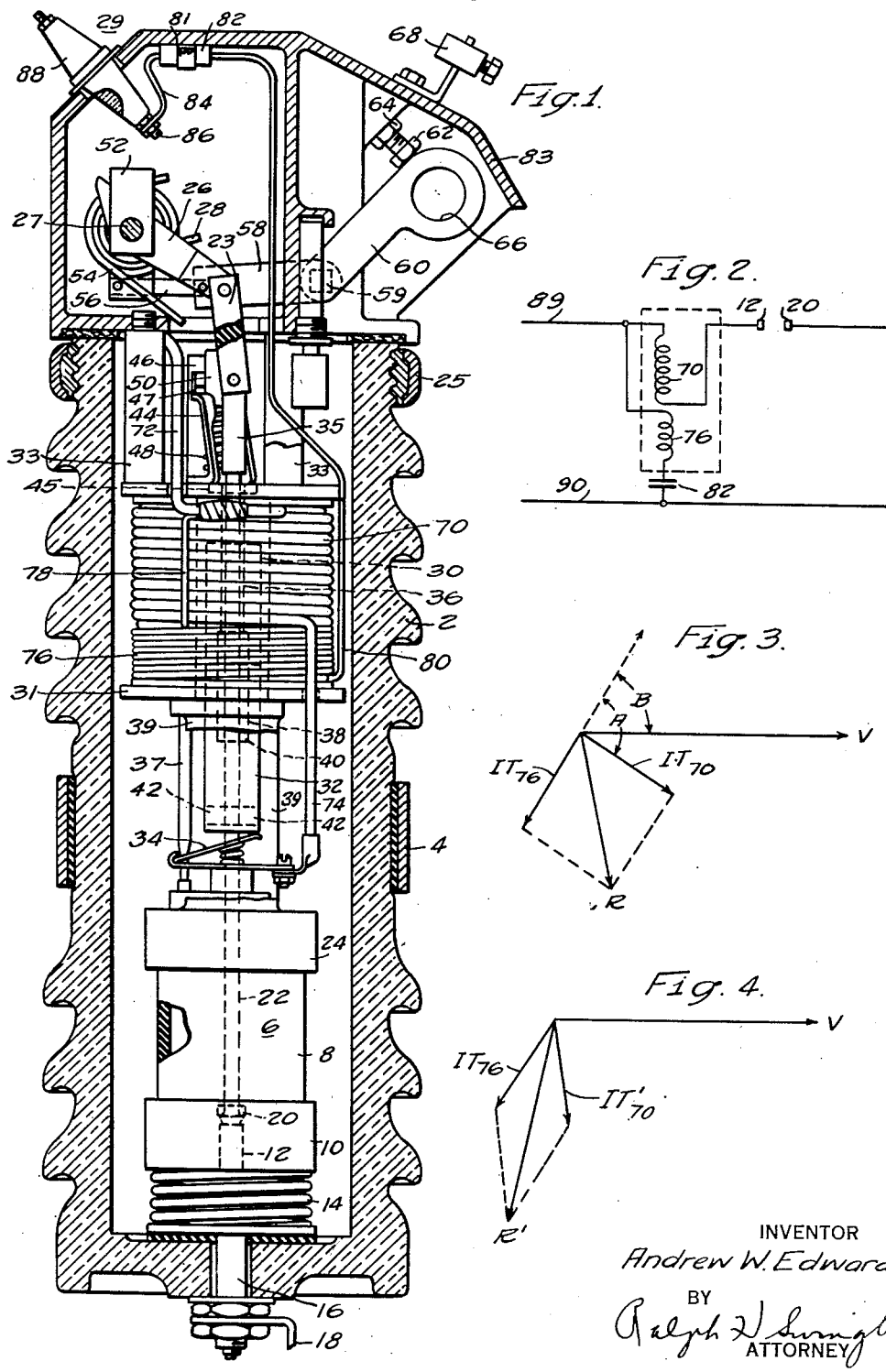
INVENTOR
Andrew W. Edwards.
BY
Ralph W. Swingle
ATTORNEY Patented Oct. 26, 1948

2,452,442

UNITED STATES PATENT OFFICE 2,452,442

AUTOMATIC RECLOSING CIRCUIT BREAKER

Andrew W. Edwards, Pittsburgh, Pa., assignor to Westinghouse Electric Corporation, East Pittsburgh, Pa., a corporation of Pennsylvania Application September 19, 1944, Serial No. 554,754

5 Claims. (Cl. 175—294)

This invention relates generally to electrical control apparatus, and more specifically to means for actuating apparatus such as circuit breakers, in response to predetermined electrical conditions of the circuit in which the apparatus is located.

Although this invention is particularly disclosed herein as incorporated in an automatic reclosing circuit breaker of the general type disclosed in J. M. Wallace Patent No. 2,333,604, Circuit interrupter, issued November 2, 1943 to the same assignee of this invention, wherein this invention has certain novel features of cooperation, it is to be understood that the invention is not limited in use to this particular circuit breaker, but is also useful with other types of circuit breakers and may even be used for actuating electrical apparatus other than circuit breakers.

The circuit breaker disclosed in the aforementioned Wallace patent is representative of a type of circuit breaker which is used to a considerable extent on rural lines having low short-circuit capacity, in that it is provided with a current coil for operating the breaker, with the coil connected in series in the circuit so as to carry load current under normal conditions. Of course under fault conditions, such a coil will also carry the excess current and thus be energized sufficiently to operate the breaker. One disadvantage of circuit breakers of this type is that on long lines, when the fault occurs at a remote point, the short-circuit current may be limited to a value only slightly larger than the rated load current of the breaker, and consequently the breaker will fail to operate properly. In such cases, even fuses are inadequate protection because they too, require a magnitude of current considerably above rated load current to effect a circuit interrupting operation.

One object of this invention, therefore, is to provide novel actuating means for a circuit breaker which will respond to the low power factor associated with a fault to cause operation of the breaker.

Another object of this invention is to provide novel actuating means for a circuit breaker which will respond to overload currents caused by faults occurring adjacent the breaker and which will also respond to the low power factor associated with remote faults to operate the breaker in each case.

Another object of this invention is to provide novel means for operating a circuit breaker including series and shunt coils which draw out-of-phase currents so as to be responsive to overloads to cause operation of the breaker.

Another object of this invention is to provide novel solenoid means in a circuit breaker for directly separating the breaker contacts in direct response to overloads and to the low power factor accompanying overloads.

These and other objects of this invention will become more apparent upon consideration of the following detailed description of a preferred embodiment thereof, when taken in connection with the attached drawing, in which:

Figure 1 is a substantially longitudinal sectional view through a circuit breaker embodying the invention, Fig. 2 is a diagrammatic view illustrating the circuit connections for the breaker shown in Fig. 1, Fig. 3 is a vector diagram illustrating ordinary load conditions, and Fig. 4 is another vector diagram illustrating the vector quantities under fault conditions near the end of the line.

As previously stated, the circuit breaker illustrated on the drawing is in many respects substantially identical with that disclosed in the aforementioned Wallace patent, and this breaker comprises, in general, a cylindrical casing 2 having an open top and a closed bottom wall, with the casing being of insulating material, such for example as porcelain or the like. Casing 2 is adapted to be supported at a point intermediate the ends thereof, for example, as by a supporting sleeve 4, which may be mounted on a cross-arm or other support. Within casing 2 at the lower end thereof, there is provided an interrupter chamber 6 comprising a cylindrical tube 8 of insulating material, such for example as fiber or the like, having end caps 10 and 24 secured to the opposite ends of the tube in any desired manner. Lower end cap 10 of the interrupter chamber is provided interiorly thereof with a stationary contact 12 projecting into the interrupter chamber, and is conductively connected to a terminal bolt 16 extending through the closed bottom wall of casing 2, by a conducting coil compression spring 14 seated between lower cap 10 and the head of terminal bolt 16. Terminal bolt 16 forms one terminal of the breaker, and may have a line conductor 18 secured thereto exteriorly of the casing.

Within interrupter chamber 6, there is provided a movable contact head 20 adapted to engage fixed contact 12, with the movable contact head being mounted on a contact rod 22 which slidably extends through an aperture provided in upper cap 24, and upwardly through casing 2 to be connected at its upper end adjacent the top of the casing with an actuating crank 26 by means of connecting links 23 of insulation, such as fiber or the like. Actuating crank 26 is rotatably mounted on a shaft 27 which extends transversely across the hollow portion of a cover structure 29 seated on the open end of casing 2. Cover structure 29 may be secured in position in any desired manner, such for example as by securing means (not shown) connecting the bottom flange of the cover structure with a collar 25 suitably secured to the upper end of casing 2. Actuating crank 26 for the contact rod 22 is biased in a clockwise direction so as to cause engagement of contact head 20 with fixed contact 12, by a reclosing spring 28 coiled about shaft 27, and reacting between actuating crank 26, and a generally U-shaped spring support 52 rotatably mounted on shaft 27, but normally held against counterclockwise movement thereon by means which will hereinafter be described.

It will be observed that contact actuating rod 22 passes upwardly through a solenoid supporting frame 31 between interrupter chamber 6 and the upper end of the contact actuating rod. Solenoid supporting frame 31 comprises spaced top and bottom supporting plates which are preferably secured together at one side thereof by an integral connecting plate (not shown), or the like. The top plate of the solenoid supporting frame is supported from cover structure 29 by a plurality of supporting posts 33 suitably secured to the cover structure and frame 31, and interrupter chamber 6 is, in turn, supported from supporting frame 31 by a pair of spaced supporting plates 39 suitably secured to the bottom plate of solenoid supporting frame 31 and top cap 24 of the interrupter chamber. In this manner, all the parts of the breaker are supported from cover structure 29, and may be removed from or inserted in casing 2 as a unit with the cover structure. When the mechanism is inserted in casing 2, the circuit is completed to bottom cap 10 of the interrupter chamber by engagement thereof with conductor spring 14.

As pointed out above, reclosing spring 28 acts to normally bias contact rod 22 in a direction to cause contact head 20 to engage fixed contact 12. This will cause automatic closing of the circuit through these contacts following a circuit interrupting operation. In order to separate the contacts to perform a circuit interrupting operation, there is provided a solenoid having a substantially cylindrical core 32 slidably mounted on contact rod 22, and the core is also mounted for sliding movement within a dashpot cylinder sleeve 30 mounted between the top and bottom plates of solenoid supporting frame 31. It will be noted that solenoid core 32 has lost motion with respect to contact rod 22, and it can move the contact rod only after the core has been moved upwardly a distance sufficient to cause engagement of the bottom wall thereof with the enlarged portion 40 of an actuating sleeve 36 slidably mounted on contact actuating rod 22, and movable by upward motion of the core into engagement with the shoulder 35 adjacent the upper end of contact rod 22. Solenoid core 32 has an annular inwardly extending projection 38 adapted to closely slidably engage the enlarged portion 40 of actuating sleeve 36, so that a dashpot action is obtained during upward movement of the core. This dashpot action continues until projection 38 on the core moves to a point above enlarged portion 40 on the actuating sleeve, whereupon the upper end of dashpot sleeve 30 may freely vent through side openings 42 at the lower end of core 32. Contact rod 22 is adapted to be releasably held at any open position of the contacts except a position where they are closely adjacent each other, by a wedge-type latch 34, mounted on the contact rod and co-operable with a latch rod 37 extending between the lower plate of solenoid supporting plate 31 and top cap 24 of the interrupter chamber. Latch 34 is adapted to be released by downward movement of solenoid core 32, so that the closing movement of contact rod 22 takes place at substantially the same rate as the return movement of solenoid core 32 which is controlled by its dashpot action in dashpot sleeve 30.

Preferably lockout means for maintaining the breaker contacts separated in response to a predetermined number of closely successive circuit interrupting operations is provided, for example mounted on the top plate of solenoid supporting frame 31. Such lockout means may comprise a cylindrical sleeve 46 containing a notched piston 47 which is adapted to be advanced each time the breaker operates to open the circuit, so that after it has been advanced a predetermined amount as by a predetermined number of closely succeeding interrupting operations, it will cause the breaker contacts to remain open, in a manner to be described. The lockout piston 47 has the notched portion thereof accessible through a side opening in cylinder 46 so as to be engaged by a pawl 44 pivotally and slidably mounted on a guide rod 50 and normally maintained out of engagement with notched piston 47 by a return spring 48. Pawl 44 is adapted to be actuated by a flange 45 provided on the upper end of actuating sleeve 36, each time the actuating sleeve moves upwardly to engage shoulder 35 on contact rod 22. This causes upward movement of lockout piston 47 a predetermined amount each time the breaker operates to interrupt the circuit, and because this piston and cylinder 46 constitute a dashpot arrangement, the piston will slowly return to its original position if the condition causing the interrupting operation clears before the breaker operates the number of closely succeeding circuit interrupting operations necessary to advance lockout piston 47 to cause the breaker to remain open.

In order to normally maintain spring support 52 mounted within cover structure 29, against counterclockwise rotation from the position shown in Fig. 1, and to permit such counterclockwise rotation of spring support 52 and thus prevent reclosing spring 28 from reclosing the breaker contacts, the spring support has one leg thereof extended and pivotally connected to a toggle lever 56, which in turn is pivotally connected with a second toggle lever 58 secured on a shaft 59 extending to the outside of the hollow portion of cover structure 29. A lockout spring 54 reacting between spring support 52 and the bottom flange of cover structure 29 acts to bias the spring support in a counterclockwise direction about its supporting shaft 27. Such counterclockwise movement of spring support 52 is normally prevented by reason of toggle links 56 and 58 being normally held at an overcenter position by engagement of an actuating handle 60 secured to the outer end of shaft 59 with a stop bolt 62, which may be secured in any desired adjusted position by a lock nut 64. Operating handle 60 preferably is provided with a hookeye 66 at the outer end thereof for engagement by a hookstick or other operating member. In the normal position of operating handle 60, it lies within an integral hood portion 83 of cover structure 29.

Toggle levers 56 and 58 are positioned directly above lockout piston 47, so that when the lockout piston has been advanced by a plurality of closely succeeding circuit interrupting operations, it will finally engage the toggle links adjacent the knee of the toggle to move the toggle links over-center to permit collapse thereof and consequent rotation of spring support 52 in a counterclockwise direction by lockout spring 54, to prevent reclosure of the contacts, and maintain them in a separated condition.

The parts of the circuit breaker thus far described and their operation are substantially identical with the parts of the breaker and their operation disclosed in the aforementioned Wallace patent, and reference is hereby made to this patent for a more detailed description of such parts and their particular modes of operation.

The solenoid coil proper in accordance with this invention comprises a coil portion 70 of relatively large wire, which has one end thereof connected by a conductor 72 to cover structure 29, and the cover structure carries a terminal fixture 68 which constitutes another terminal for the breaker. The other end of coil portion 70 is connected by a conductor 74 with contact rod 22, and from there the circuit proceeds in the closed position of the breaker to movable contact head 20, fixed contact 12, interrupter chamber cap 10, conducting spring 14, to terminal bolt 16. Thus, solenoid coil portion 70 is connected in series circuit relation with contacts 12 and 20 between breaker terminals 68 and 16. The solenoid coil also includes a portion 76 of relatively small wire, for a purpose to be described, and this coil portion has one end connected by a conductor 78 with the conductor 72 to be electrically connected through cover structure 29 with breaker terminal 68. The other end of solenoid coil portion 76 is connected by a conductor 80 to a condenser 82 suitably mounted as by a mounting strap 81 within the hollow cover structure, and this in turn is connected by a conductor 84 with a conductor rod 86, which extends through an insulating bushing 88, suitably secured in an opening through the hollow portion of cover structure 29. Bushing 88 may be of any desired insulating material, such as porcelain or the like. It will be observed that solenoid coil portion 76 is connected in series circuit relation with condenser 82 between breaker terminal 68 and bushing rod 86, the outer end of which forms a third terminal for the circuit breaker.

Referring to the circuit diagram shown in Fig. 2, it will be observed that with terminals of the breaker connected in a line conductor 89, coil portion 70 and breaker contacts 12 and 20 will be connected in series with this line conductor, so that coil portion 70 will normally carry load current. This is the reason that the wire comprising coil portion 70 must be relatively large. Coil portion 76 and condenser 82 will be connected across the circuit when the other conductor 90 of the circuit is connected with the third breaker terminal, and since coil 76 is really a voltage coil, it may be of relatively small wire since little current will flow.

The circuit including coil portion 76 and condenser 82 is designed so as to draw a leading power factor current as shown by the dotted arrow in Fig. 3. The particular phase relations and magnitudes of current and voltage shown in Figs. 3 and 4 are merely illustrative of such quantities for one assumed circuit condition and should not be construed as limiting the scope of this invention. It has been found that for the optimum condition angle A should be about 90°. Since 80% power factor is logical assumption for ordinary load currents, and the angle corresponding to this power factor is approximately 40°, the arrow $IT_{70}$ indicates the phase relation and magnitude of the ampere turns caused by load current passing through coil 70 and breaker contacts 12 and 20 for this power factor. It will be observed therefore, that the leading current through the circuit comprising coil portion 76 and condenser 82 in the example given draws a 60% leading power factor, or in other words, the angle B (Fig. 3) equals about 50°. It has also been found that the best ratio of ampere turns on fault to ampere turns on load conditions is obtained by having the ampere turns of both coil portions 70 and 76 approximately equal, and Figs. 3 and 4 illustrate this condition.

The polarity of current through the coil portion 76 and condenser 82 is reversed by winding coil portion 76 in a direction opposite from that in which coil portion 70 is wound, so that this current assumes the phase relation shown by arrow $IT_{76}$. Accordingly, under normal load conditions, the resultant of the ampere turns through the two coil portions 70 and 76 has the magnitude R (Fig. 3). Under the particular fault condition illustrated in Fig. 4, the fault current is assumed to be equal to the load current, which obviously would be the worst condition encountered. A comparison of Figs. 3 and 4 shows that assuming a 10% power factor on fault (Fig. 4), the ampere turns available to open the breaker contacts are increased about 37% for this particular example. On fault currents which exceed $IT'_{70}$, shown in Fig. 4, $IT_{76}$ would be smaller since the voltage would drop, but the vector sum of $IT_{76}$ and $IT'_{70}$ or R' will always exceed the value R' shown in Fig. 4.

From the foregoing, it is apparent that by the particular arrangement and electrical connections of coil portions 70 and 76 disclosed herein, the breaker will operate to interrupt the circuit even on faults which have a fault current substantially the same in value as normal load current, because the low power factor of such faults causes the resultant ampere turns of the two coil portions to increase, thus enabling these two coil portions to exert a sufficient force on core 32 to cause opening of the breaker. Moreover, it is apparent that it will also operate to open the circuit on ordinary overloads where there is no decrease in power factor, merely by an increase in the value of $IT'_{70}$ so that coil portion 70 will cause sufficient force to be exerted on core 32 as to cause a circuit interrupting operation of the breaker. This breaker is therefore responsive to a predetermined lowering of power factor as well as to overloads to cause the breaker to open. This means that the breaker comprising this invention will open on faults which the ordinary breaker having merely a series operating coil would not respond to, namely, faults on circuits having a low short-circuit capacity. These results are obtained by the use of solenoid means for separating the breaker contacts which comprises a pair of coil portions, one of which is connected in series with one line conductor and with the breaker contacts so as to carry load and overload currents, and the other coil portion being connected across the circuit, and having means such as a condenser in its circuit so as to draw current out of phase with the current of the first coil portion so that the resultant of the currents of the two coil portions will increase upon a decrease in power factor of the circuit.

Having described a preferred embodiment of the invention in accordance with the Patent Statutes, it is desired that this invention be not limited to this particular embodiment inasmuch as it will be obvious, particularly to persons skilled in the art, that many modifications and changes may be made in this particular species of the invention, without departing from the broad spirit and scope of this invention. Therefore, it is desired that this invention be interpreted as broadly as possible as defined in the following claims.

I claim as my invention:

1. An automatic reclosing circuit breaker, comprising, separable contacts which are biased closed so as to automatically close the circuit following a circuit interrupting operation, solenoid means for separating said contacts against said bias comprising a coil connected in series with said circuit so as to draw current substantially in phase with the current through said contacts so as to be responsive to overload currents to separate said contacts and interrupt the circuit, and another coil capacitively connected across said circuit to draw current lagging out of phase with the current through said contacts, whereby said solenoid means is effective to separate said contacts in response to low power factor faults as well as overloads which cause excess current at the breaker.

2. An automatic reclosing circuit breaker, comprising, separable contacts which are biased closed so as to automatically close the circuit following a circuit interrupting operation, solenoid means for separating said contacts against said bias comprising a coil connected in series with said circuit so as to draw current substantially in phase with the current through said contacts so as to be responsive to overload currents to separate said contacts and interrupt the circuit, and another coil capacitively connected across said circuit to draw current lagging out of phase with the current through said contacts, and the ampere turns of said coils being substantially equal, whereby said solenoid means is effective to separate said contact in response to low power factor faults as well as overloads which cause excess current at the breaker.

3. An automatic reclosing circuit breaker, comprising separable contacts which are biased closed so as to automatically close the circuit following a circuit interrupting operation, solenoid means for separating said contacts against said bias in response to overloads and low current faults, comprising a current coil in series with the circuit through said contacts so as to be responsive to overload currents to separate said contacts and interrupt the circuit, and a voltage coil wound in a direction opposite to the direction said current coil is wound, said voltage coil being capacitively coupled with said circuit, whereby said solenoid means is effective to separate said contacts in response to low power factor faults as well as overloads which cause excess current at the breaker.

4. An automatic reclosing circuit breaker, comprising, separable contacts which are biased closed so as to automatically close the circuit following a circuit interrupting operation, solenoid means for separating said contacts against said bias comprising a coil connected in series with said circuit so as to draw current substantially in phase with the current through said contacts so as to be responsive to overload currents to separate said contacts and interrupt the circuit, and another coil capacitively connected across said circuit to draw current lagging out of phase with the current through said contacts, said coils being wound in opposite directions, and the ampere turns of said coils being substantially equal, whereby said solenoid means is effective to separate said contacts in response to low power factor faults as well as overloads which cause excess current at the breaker.

5. An automatic reclosing circuit breaker, comprising, separable contacts which are biased closed so as to automatically close the circuit following a circuit interrupting operation, solenoid means for separating said contacts against said bias in response to overloads and low current faults, comprising a current coil in series with the circuit through said contacts so as to be responsive to overload currents to separate said contacts and interrupt the circuit, a voltage coil, and means in the circuit of said voltage coil causing it to draw current lagging out of phase with respect to the current passing through said current coil, whereby said solenoid means is effective to separate said contacts in response to low power factor faults as well as overloads which cause excess current at the breaker.

ANDREW W. EDWARDS.

REFERENCES CITED

The following references are of record in the file of this patent:

UNITED STATES PATENTS

| Number | Name | Date |
|---|---|---|
| 1,138,212 | Hall | May 4, 1915 |
| 1,157,051 | Sweitzer | Oct. 19, 1915 |
| 1,206,699 | Harthan | Nov. 28, 1916 |
| 1,211,000 | Sprong et al. | Jan. 2, 1917 |
| 1,438,789 | Schon | Dec. 12, 1922 |
| 1,644,525 | Hoyler | Oct. 4, 1927 |
| 1,756,923 | McNairy | Apr. 29, 1930 |
| 1,948,711 | Hester | Feb. 27, 1934 |
| 1,967,093 | Lewis | July 17, 1934 |